United States Patent [19]

Goergen et al.

[11] Patent Number: 4,823,855

[45] Date of Patent: Apr. 25, 1989

[54] PNEUMATIC TIRE TREAD PATTERN

[75] Inventors: René Goergen, Colmar-Berg; Leo J. Hitzky, Walferdange, both of Luxembourg; Frederick W. Miller; Richard L. Galante, both of Akron, Ohio; Terry J. Waibel, Wadsworth, Ohio; Michael A. Kolowski, Mogadore, Ohio; William M. Hopkins, Hudson, Ohio

[73] Assignee: The Goodyear Tire & Rubber Company, Akron, Ohio

[21] Appl. No.: 124,303

[22] Filed: Nov. 23, 1987

[51] Int. Cl.$^4$ .............................................. B60C 11/11
[52] U.S. Cl. ................................. 152/209 R; 152/454; D12/146
[58] Field of Search ........... 152/209 R, 209 A, 209 B, 152/209 D, 454; D12/140, 142, 143, 144, 145, 146

[56] References Cited

U.S. PATENT DOCUMENTS

| D. 92,418 | 6/1934 | Miller | 12/147 |
|---|---|---|---|
| D. 220,605 | 4/1971 | Hoke | 12/142 |
| D. 263,578 | 3/1982 | Nyblom | 7/70 |
| D. 264,456 | 5/1982 | Ingley | 12/146 |
| D. 283,609 | 4/1986 | Kawabata et al. | 12/147 |
| D. 291,875 | 9/1987 | Hayakawa et al. | 12/147 |
| D. 291,876 | 9/1987 | Hayakawa et al. | 12/149 |
| 2,642,914 | 6/1953 | Palko et al. | 152/209 R |
| 3,976,115 | 8/1976 | Mirtain et al. | 152/209 R |
| 4,082,132 | 4/1978 | Arai et al. | 152/209 R |
| 4,223,712 | 9/1980 | Iwata et al. | 152/209 D |
| 4,545,415 | 10/1985 | Lindner et al. | 152/209 R |
| 4,574,857 | 3/1986 | Beeghly et al. | 152/209 B |
| 4,606,389 | 8/1986 | Haas | 152/209 R |

FOREIGN PATENT DOCUMENTS

| 2948479 | 4/1981 | Fed. Rep. of Germany . |
|---|---|---|
| 61-32272 | 5/1986 | Japan . |
| D984313 | 4/1978 | United Kingdom . |
| D990143 | 6/1979 | United Kingdom . |
| D993438 | 2/1980 | United Kingdom . |
| D1003691 | 5/1981 | United Kingdom . |

Primary Examiner—Michael W. Ball
Assistant Examiner—Geoffrey L. Knable
Attorney, Agent, or Firm—L. R. Drayer

[57] ABSTRACT

A pneumatic tire (10) has a preferred cross-sectional shape which acts in concert with a preferred tread structure to provide varying performance characteristics under varying operating conditions. The tread (11) has a directional tread pattern, with the net-to-gross ratio being higher in a central portion (CP) of the tread than in the laterally outer portions (OP$_1$, OP$_2$). The stiffness of the block elements (64,65,66,67,68,69,70,71) of the tread also varies across the width of the tread.

34 Claims, 4 Drawing Sheets

PNEUMATIC TIRE TREAD PATTERN

The present invention relates generally to pneumatic tires, and more specifically to pneumatic tires intended for use both on and off of paved surfaces.

A very popular class of motor vehicles are those which the owner can use both for commuting over paved highways and for recreational use in off-highway situations. Such vehicles often take the form of pick-up trucks or small general purpose motor vehicles. It is quite common for such on/off road vehicles to have four wheel drive capability. Such vehicles present a special challenge to a tire engineer because the performance characteristics desired for highway use are tradeoffs with the performance requirements for off-road use. For example, mud traction versus treadwear, off-road handling versus on-road handling, and wet traction versus dry traction. Furthermore, when an on/off road all purpose vehicle is used for commuting about town it is seldom loaded to its full weight capacity, whereas when the same vehicle is packed with recreational equipment for off-road use the tires are subjected to much greater loads. A tire according to the present invention has the capacity to provide adequate treadwear, mud traction, sand traction, on road handling, off road handling, wet traction and dry traction when used with small general purpose motor vehicles and trucks.

To acquaint persons skilled in the tire art with the invention a presently preferred embodiment illustrative of the best mode now contemplated for the practice of the invention is described herein making reference to the attached drawings forming a part of the specification and in which drawings.

A tire 10 according to a preferred embodiment of the invention comprises a ground engaging tread 11 extending circumferentially about the axis of rotation of the tire and having a pair of lateral edges $TE_1$, $TE_2$. A sidewall portion 13,14 extends radially inwardly from each lateral edge of the tread. As used herein, and in the claims, the terms "radial" and "radially" are understood to refer to directions that are perpendicular to the axis of rotation of the tire, and the terms "lateral", "laterally", "axial" and "axially" are understood to refer to directions going from one sidewall of the tire towards the other sidewall of the tire.

Figure 3:
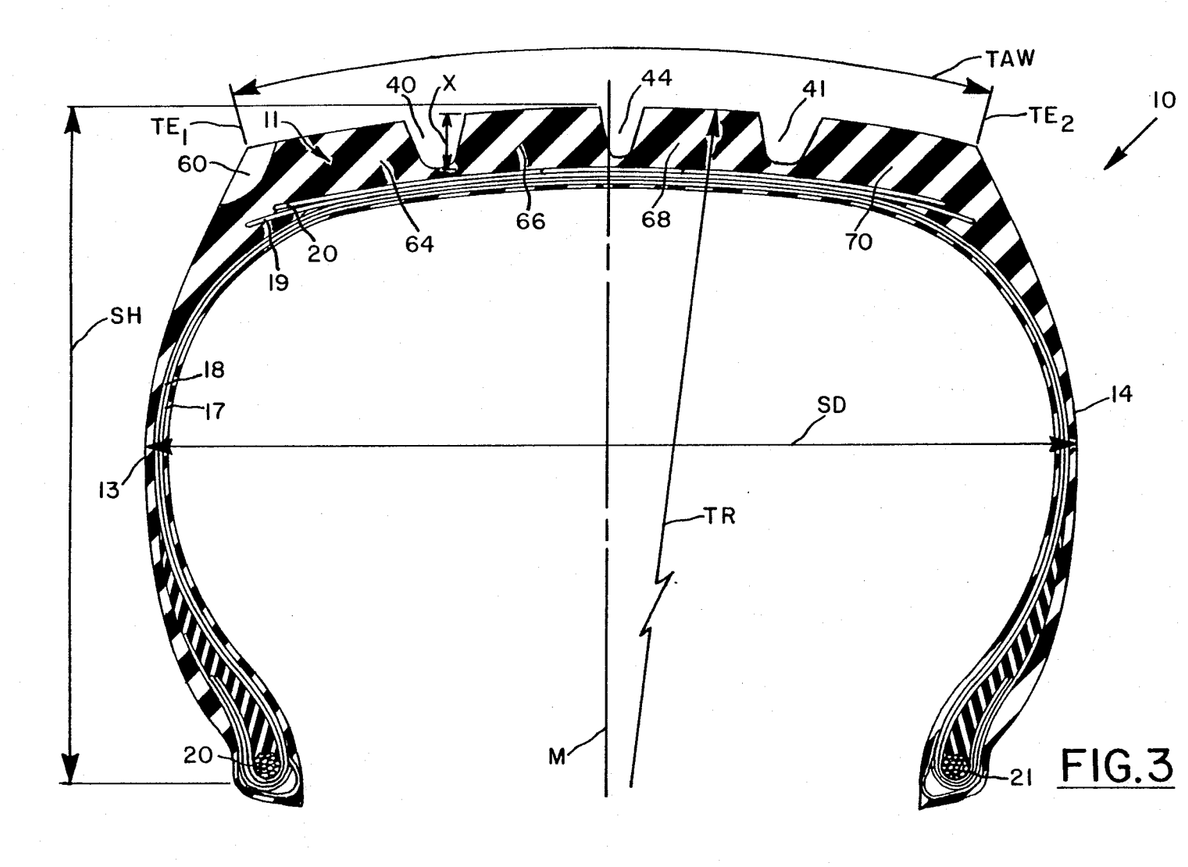
FIG. 3 is a cross-sectional view of said tire taken along a plane that includes the axis of rotation of the tire looking in the direction of arrows 3—3 of FIG. 2.

As shown in FIG. 3, a tire according to a preferred embodiment of the invention has at least one carcass ply 17,18 of side-by-side cables which intersect the mid-circumferential plane M of the tire at 75° to 90° with respect to said plane. As used herein and in the claims, the "mid-circumferential plane" of a tire is understood to refer to a plane that is perpendicular to the axis of rotation of the tire and is located midway between the sidewalls 13,14 of the tire when the tire is mounted upon its specified rim and inflated to its specified inflation pressure but not subjected to a load. The specified rim and inflation pressure can be determined from any of the following sources: (a) indicia molded onto a sidewall of the tire by the tire manufacturer; (b) specification or sales literature available from the tire manufacturer; (c) the *YEARBOOK OF THE TIRE AND RIM ASSOCIATION* for the year in which the tire is manufactured: or (d) the *YEARBOOK OF THE EUROPEAN TIRE AND RIM TECHNICAL ORGANIZATION* for the year in which the tire is manufactured. In a preferred embodiment the reinforcing cables of the carcass plies 17,18 comprise a non-metallic material such as nylon, aramid, or most preferably polyester. Preferably each of the carcass plies 17,18 is folded axially and radially outwardly about a pair of axially spaced apart substantially inextensible annular bead cores 20,21. However, it is felt that the invention may be practiced with any suitable number of carcass plies folded in any suitable manner about bead cores in accordance with good engineering practice, and that if desired the carcass plies could be reinforced with metallic cables.

At least one belt ply 19,20 of side-by-side cables is disposed radially outwardly of the carcass ply, or plies, 17,18 in a crown portion of the tire. In the preferred embodiment the belt plies are reinforced by metallic cables, but it is understood that the belt plies may be reinforced by cables of any suitable material such as aramid. A ground engaging tread 11 is disposed radially outwardly of the belt ply, or plies, 19,20 and extends circumferentially about the tire. The tread 11 has a pair of lateral edges $TE_1$, $TE_2$ with a sidewall portion 13,14 extending radially inwardly from each of said lateral edges.

It is believed that the good performance characteristics of a tire according to the invention are attributable at least in part to the cross-sectional shape of the tire. All of the tire dimensions used herein and in the claims are understood to refer to a tire having a tread that has not yet been used on a vehicle but which has been mounted on its specified rim and inflated to its specified inflation pressure while not being subjected to any load. That is to say, the invention applies both to new tires and retreaded tires. Definitions of the terms used herein and in the claims for describing the cross-sectional shape of a tire according to the invention are set forth below with reference to FIG. 3.

"Section height" (SH) refers to the radially measured distance from the nominal bead diameter of the tire to the maximum diameter of the tire.

"Maximum section width" (SD) refers to the greatest axial distance between the axially outer surfaces of the tire sidewalls 13,14 exclusive of indicia or ornamentation on the sidewalls.

"Aspect ratio" refers to the ratio of section height SH to maximum section width SD, or put another way SH/SD.

"Tread radius" (TR) refers to the radius of curvature, having its center on the mid-circumferential plane M of the tire, which is followed by the radially outer surfaces of the block elements 6,64,66,68,70 of the tread.

"Tread arc width (TAW) refers to the maximum distance across the tread in a plane that contains the axis of rotation of the tire measured along the curvature of the radially outer surfaces of the block elements. It is further understood that the tread arc width of a tire according to a preferred embodiment of the present invention extends between the axially outermost extents $TE_1$, $TE_2$ of the axially outermost extending block elements 60,70 on each side of the mid-circumferential plane M of a tire.

A tire in accordance with the present invention has an aspect ratio SH/SD in the range of 0.60 to 0.95, preferably in the range of 0.60 to 0.80. For example, a tire of size 31×10.50 R15 has a section height SH of about 7.7 inches, and a maximum section width SD of about 10.5 inches and an aspect ratio of about 0.73.

A tire in accordance with the present invention has a ratio of tread radius to maximum section width TR/SD in the range of 1.0 to 2.4, preferably in the range of 1.2 to 2.2. For example, a tire of size 31×10.50 R15 has a tread radius TR of about 18.4 inches, a maximum section width SD of about 10.5 inches and the ratio TR/SD is about 1.8.

A tire in accordance with the present invention has a ratio of tread radius to tread arc width TR/TAW in the range of 1.4 to 2.8. For example, a tire of size 31×10.50 R15 inches, a tread arc width TAW of about 8.3 inches and the ratio TR is about 2.2.

It is not believed that any one of the dimensional ratios set forth above is critical when considered alone, but rather that in combination these parameters along with other features of the invention that will be disclosed herein cooperate to provide a pneumatic tire having a desirable portfolio of performance characteristics.

The tread 11 of a tire according to the invention has first and second straight grooves 40,41 therein which extend circumferentially about the tire. As used herein and in the claims, a circumferentially extending "straight groove" is understood to refer to any groove for which the groove edges at the outer surface of the tread are disposed such that a plane which is perpendicular to the axis rotation of the tire could be located between said groove edges without intersecting any edge of the groove at any point around the circumference of the tire. That is to say, the groove edges do not need to be parallel to one another in order for a circumferentially extending groove to be a straight groove. In the preferred embodiment both said first and second straight grooves 40,41 have centerlines 46,47 that follow paths which are parallel to the mid-circumferential plane M. One of said straight circumferentially extending grooves 40,41 is disposed on each side of the mid-circumferential plane M of the tire and is spaced from said mid-circumferential plane by a distance as indicated at 42 and 43 in FIG. 4, in the range of 10% to 25% of the tread arc width TAW.

Figure 4:
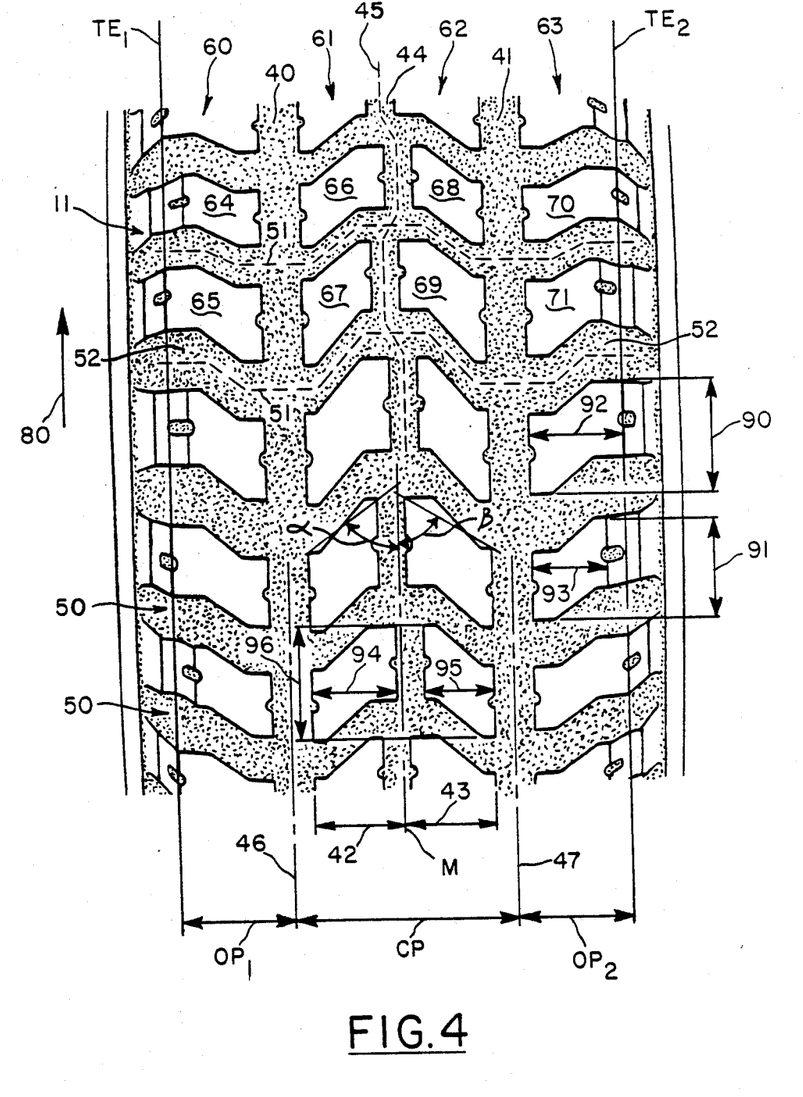
FIG. 4 is an enlarged fragmentary view of a portion of the tread of said tire looking towards the axis of rotation of the tire.

As used herein and in the claims, dimensions which are expressed as a percentage of the thread arc width TAW are understood to be measured along the arc of the tread radius TR of a tire having a tread that has not yet been used on a vehicle but which has been mounted on its specified rim and inflated to its specified inflation pressure while not being subjected to any load. The width of the straight circumferentially extending grooves 40,41 at the radially outer surface of the tread measured perpendicular to the mid-circumferential plane is preferably in the range of 6% to 9% of the tread arc width TAW, and most preferably in the range of 7% to 8% of the tread arc width. The width of these straight grooves 40,41 needs to be sufficient to allow for evacuation of water from the footprint of the tire when the tire is operated on a wet surface.

A circumferentially extending central groove 44 is disposed axially between said first and second circumferentially extending straight grooves 40,41. Preferably, the central groove 44 intersects the mid-circumferential plane M of the tire. While in the preferred embodiment the central groove 44 meets the definition of a straight groove as used herein, (see line M in FIG. 4 that represents the mid-circumferential plane), it is preferred that the central groove have a centerline as represented by dashed line 45 that follows a zig-zag path. As used herein and in the claims, "zig-zag" is understood to refer to a line, path or groove which has adjacent segments that are oriented at angles other than 0° with respect to one another. Most preferably every other segment of the zig-zag path followed by the centerline 45 of the central groove 44 is parallel to the mid-circumferential plane M of the tire. However, it is understood that a tire according to the invention could have a central groove with a zig-zag centerline and not meet the definition of a straight groove used herein.

A plurality of laterally extending zig-zag grooves 50, each of which extends laterally across the tread 11 from one tread edge $TE_1$, to the other tread edge $TE_2$, are disposed circumferentially about the tire. Preferably the number of laterally extending zig-zag grooves 50 is in the range of thirty-seven to fifty-seven with the exact number depending upon the size of the tire. For example, a tire of size 31×10.50 R15 has about 46 laterally extending zig-zag grooves in its tread portion. It is preferred that the centerlines 51 of each of the laterally extending zig-zag grooves 50 follow substantially identical paths across the tread and that said centerlines 51 be substantially symmetrical with respect to the mid-circumferential plane M of the tire. In a preferred embodiment each laterally extending zig-zag groove 50 has a centerline 51 which follows a path with every other segment of said path being oriented substantially perpendicular to the mid-circumferential plane M of the tire. It is especially preferred that the segments 52 of each laterally extending zig-zag groove 50 which intersect a lateral edge $TE_1$, $TE_2$ of the tread be oriented perpendicular to the mid-circumferential plane M in order that good tractive forces are generated near the tread edges when the tire is operated in mud or sand. The width of the laterally extending grooves needs to be sufficiently large to allow the evacuation of water or mud from the footprint of the tire.

It is preferred to have either the width of the laterally extending grooves or the circumferential spacing between next adjacent laterally extending grooves, or both the groove width and circumferential spacing vary about the tire. These variations accommodate what is known in the tire art as pitching to help obtain desirable noise generation characteristics for a tire when it is used on a vehicle.

Figure 1:
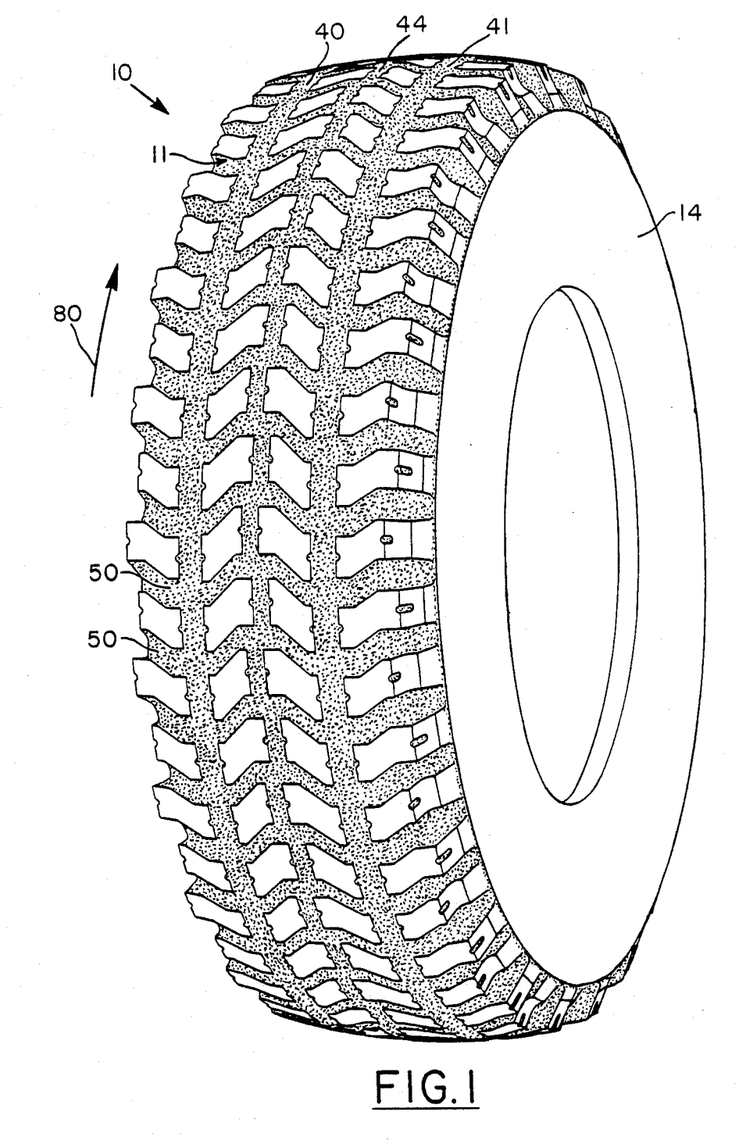
FIG. 1 is a perspective view of a tire according to the preferred embodiment of the invention.
Figure 2:
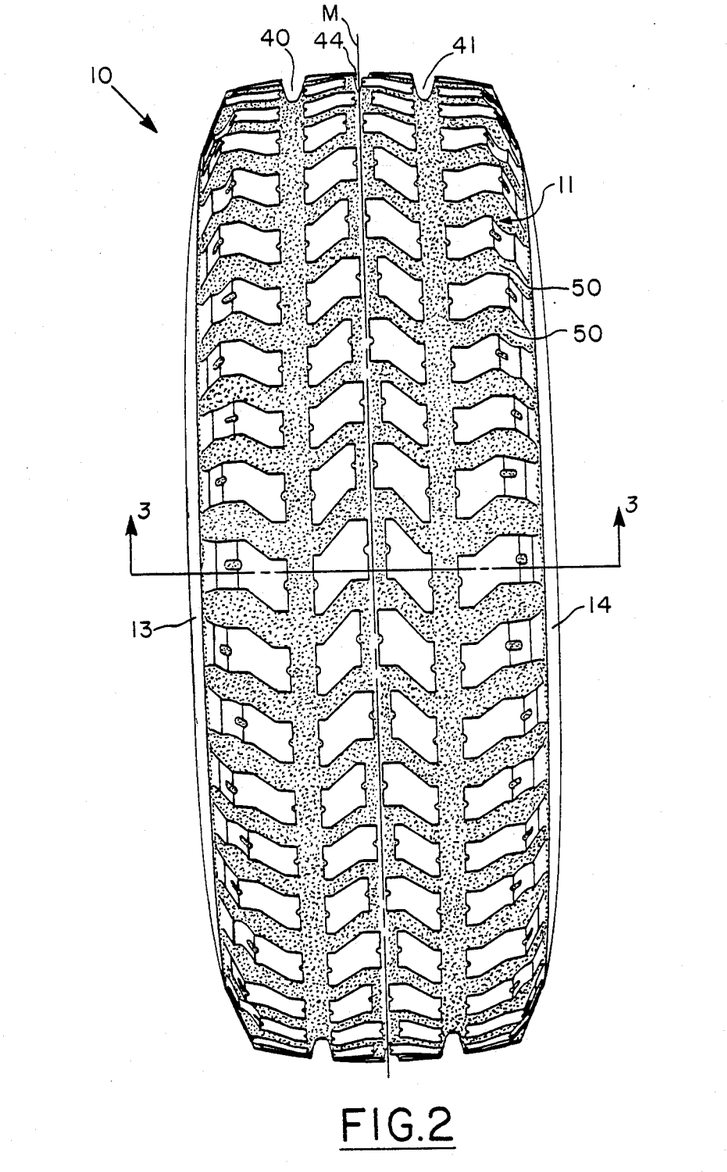
FIG. 2 is a front elevation view of the tire shown in FIG. 1.

The circumferentially and laterally extending grooves 40,41,44,50 cooperate with one another to define four circumferentially extending arrays 60,61,62,63 of block elements 64,65,66,67,68,69,70,71. Circumferentially aligned block elements 66,68; 67,69 of the two axially centermost arrays 61,62 cooperate with one another to present a "V" formation. In a preferred embodiment of the invention the circumferentially aligned block elements 64,66; 65,67; 68,70; 69,71 of the arrays 60,61;62,63 on the same side of the mid-circumferential plane M cooperate with one another to present "V" formations pointing in the opposite circumferential direction from the "V" formation presented by the axially centermost arrays. Such a tread design is referred to in the tire art as being a directional design. As used herein and in the claims a "directional" tread design is understood to be a tread design which operates differently when the tire is rotated in one direction from the way the tire operates when it is rotated in the opposite direction. A tire according to the preferred embodiment illustrated in the drawings is intended to rotate in the direction indicated by arrow 80 in FIGS. 1 and 4 when a vehicle on which the tire is mounted is going forward.

Preferably, for each of the block elements 66,67,68,69 in the two axially centermost arrays 61,62 a straight line extending from the axially outermost point on the leading edge of the block element to the axially innermost point on said leading edge is oriented at an angle $\beta$, $\alpha$ in the range of 30° to 65°, preferably 35° to 60°, with respect to the mid-circumferential plane M of the tire. As used herein and in the claims, the "leading edge" of a block element in a directional tread design is the edge of the block element that will enter a tire footprint first when the tire rotates in the preferred direction. As can be seen in FIG. 4, the angles $\beta$, $\alpha$ are the average angles at which the leading edge of a block element are inclined.

In a preferred embodiment of the invention each of the block elements has a radially outer surface and the axial extent of the radially outer surfaces of circumferentially adjacent block elements 64,65; 66,67; 68,69; 70,71 in each circumferentially extending array 60,61,62,63 alternate between wide and narrow widths. For the two axially centermost arrays 61,62, the axial extent 94 of the radially outer surfaces of the wide block elements 66,69 is in the range of 14% to 20% of the tread arc width TAW and the axial extent 95 of the narrow block elements 67,68 is less than that of the circumferentially adjacent wide block elements and is in the range of 10% to 16% of the tread arc width TAW. For the two axially outermost arrays 60,63 the axial extent 92 of the radially outer surfaces of the wide block elements 65,70 is equal to the distance from the respective tread edge $TE_1$, $TE_2$ to the nearest straight circumferential groove 40,41, and the axial extent 93 of the radially outer surfaces of the narrow block elements 64,71 extends from the respective straight circumferential groove 40,41 for 60% to 90% of the axial extent 92 of said wide block elements 65,70 of the same array 60,63. As a result of this preferred arrangement of the blocks in the axially outermost arrays 60,63 the leading edges of the wide block elements 65,70 near the tread edges $TE_1$, $TE_2$ can exert extra traction when the tire is operated in mud or sand. The number of block elements in each of the circumferentially extending arrays 60,61,62,63 is in the range of 36 to 56 depending upon the size of the tire.

Preferably, for each block element, the radially measured distance X from a radially outermost surface of the block element to the radially innermost extent of any groove 40,41,44 that is adjacent to the block element is in the range of 4% to 11% of the section height SH of the tire.

Another important feature of a tire according to a preferred embodiment of the invention is the variation in stiffness between the block elements. This variation in stiffness can be represented by the varying ratios of circumferential length to axial width of the block elements. The ratio of the circumferential extent 96 to the axial extent 94 of each wide block element 66,69 of the two axially centermost arrays 61,62 is preferably in the range of 0.9 to 2.1. The ratio of the circumferential extent 96 to the axial extent 95 of each of the narrow block elements 67,68 of the two axially centermost arrays 61,62 is in the range of 1.0 to 2.4. The ratio of the circumferential extent 90 to the axial extent 92 of the wide block elements 65,70 of the two axially outermost arrays 60,63 is in the range of 0.4 to 1.5. The ratio of the circumferential extent 91 to the axial extent 93 of the narrow block elements 64,71 of the two axially outermost arrays 60,63 is in the range of 0.7 to 1.9.

In the preferred embodiment the tread is divided into three zones $OP_1$, CP, $OP_2$ across its width. The central zone CP extends between the centerlines 46,47 of the two straight circumferential grooves 40,41. The laterally outer zones $OP_1$, $OP_2$ each extend from a tread edge $TE_1$, $TE_2$ to the centerline 46,47 of the nearest straight circumferential groove 40,41. Preferably, the net-to-gross ratio of the tread in the central zone CP is greater, most preferably at least 5% greater, than the net-to-gross ratio of the laterally outer zones $OP_1$, $OP_2$ of the tread. Most preferably, the net-to-gross ratio of the tread in the central zone CP is in the range of 0.4 to 0.5. For example, a tire of size 31 × 10.50 R15 can have a net-to-gross ratio in the central zone CP of about 0.46 and a net-to-gross ratio in the laterally outer zones $OP_1$, $OP_2$ of about 0.42, such that the net-to-gross ratio in the central zone CP is about 9% greater than the net-to-gross ratio in the outer zones $OP_1$, $OP_2$. As used herein and in the claims, "net-to-gross ratio" is understood to refer to the area of a tread that is actually in contact with the ground in a static footprint of a tire as a percentage of the total area of the footprint when the tire is mounted on its specified rim, inflated to specified inflation pressure and subjected to the tire's inflated load at said inflation pressure.

It is an advantage of a tire according to the invention that due to its cross-sectional shape and preferred tread geometry, the tire will operate to provide preferred performance characteristics at different operating loads and in different operating conditions. For example, when the tire is mounted upon a small all-purpose vehicle and operated on a paved roadway at everyday commuting loads, which are far less than the tires rated load, the central portion CP of the tread is almost exclusively in contact with the roadway. The higher net-to-gross ratio of this central portion of the tread provides good treadwear and on-highway handling. When the tire is operated under higher loads and/or off-the-road the laterally outer zones $OP_1$, $OP_2$ of the tread also come into operation to provide greater traction in mud or sand and improve off-highway handling. The varying stiffness of the block elements across the tread also contributes to the performance characteristics of the tire under varying operating conditions.

While certain representative embodiments and details have been described for the purpose of illustrating the invention, it will be apparent to those skilled in the art that various changes and modifications may be made therein without departing from the spirit or scope of the invention.

We claim:
1. A pneumatic tire comprising a tread extending circumferentially about the axis of rotation of the tire and having a pair of lateral edges with a sidewall portion extending radially inwardly from each lateral edge of the tread, said tire having an aspect ratio in the range of 0.60 to 0.95, a ratio of tread radius to maximum section width in the range of 1.0 to 2.4, and a ratio of tread radius to tread arc width in the range of 1.4 to 2.8; said tread having first and second straight grooves therein which extend circumferentially about the tire, one of said straight circumferentially extending grooves being disposed on each side of a mid-circumferential plane of the tire and each of said straight circumferenetially extending grooves being spaced from said mid-circumferential plane by a distance in the range of 10% to 25% of the tread arc width, a circumferentially extending central groove is disposed axially between said first and seocnd circumfernetially extending straight grooves, a plurality of laterally extending zigzag grooves each of which extends across the tread are disposed circumferentially about the tire, said circumferentially and laterally extending grooves cooperating with one another to define four circumferentially extending arrays of circumferentially aligned block elements, circumferentially aligned block elemetns of the two axially centermost arrays cooperate with one anoyhter to present "v" formations, the portion of the tread that is disposed between the centerlines of said circumferentially extending straight grooves having a net-to-gross ratio that is greater than the net-to-gross ratio of the portions of the tread that are disposed axially outwardly of the centerlines of said circumferentially extending straight grooves, said block elements having radially outer surfaces with the axial extents of the radially outer surfaces of circumferentially adjacent block elements in each circumferentially extending array alternating between wide and narrow widths.

2. A pneumatic tire according to claim 1 wherein for the two axially centermost arrays the axial extent of the radially outer surfaces of the wide block elements is in the range of 14% to 20% of the tread arc width and the axial extent of the narrow block elements is less than that of the circumferentially adjacent wide block elements and is in the range of 10% to 16% of the tread arc width.

3. A pneumatic tire according to claim 1 wherein for the two axially outermost arrays the axial extent of the radially outer surfaces of the wide block elements is equal to the distance from a tread edge to the nearest straight circumferential groove and the axial extent of the radially outer surfaces of the narrow block elements extends from said straight circumferential groove for 60% to 90% of the axial extent of said wide block elements of the same array.

4. A pneumatic tire according to claim 2 wherein for the two axially outermost arrays the axial extent of the radially outer surfaces of the wide block elements is equal to the distance from a tread edge to the nearest straight circumferential groove and the axial extent of the radially outer surfaces of the narrow block elements extends from said straight circumferential groove for 60% to 90% of the axial extent of said wide block elements of the same array.

5. A pneumatic tire according to claim 1 wherein each of the block elements in said two axially centermost arrays has a leading edge which will be the first edge of the block element to enter a footprint of the tire when the tire is rotated in the direction in which said "V" formation point, and a straight line extending from the axially outermost point on a leading edge of each block element of said centermost arrays to the axially innermost point on said leading edge is oriented at 30° to 65° with respect to the mid-circumferential plane of the tire.

6. A pneumatic tire according to claim 2 wherein each of the block elements in said two axially centermost arrays has a leading edge which will be the first edge of the block element to enter a footprint of the tire when the tire is rotated in the direction in which said "V" formations point, and a straight line extending from the axially outermost point on a leading edge of each block element of said centermost arrays to the axially innermost point on said leading edge is oriented at 30° to 65° with respect to the mid-circumferential plane of the tire.

7. A pneumatic tire according to claim 5 wherein each of the block elements in said two axially centermost arrays has a leading edge which will be the first edge of the block element to enter a footprint of the tire when the tire is rotated in the direction in which said "V" formations point, and a straight line extending from the axially outermost point on a leading edge of each block element of said centermost arrays to the axially innermost point on said leading edge is oriented at 30° to 65° with respect to the mid-circumferential plane of the tire.

8. A pneumatic tire according to claim 4 wherein each of the block elements in said two axially centermost arrays has a leading edge which will be the first edge of the block element to enter a footprint of the tire when the tire is rotated in the direction in which said "V" formations point, and a straight line extending from the axially outermost point on a leading edge of each block element of said centermost arrays to the axially innermost point on said leading edge is oriented at 30° to 65° with respect to the mid-circumferential plane of the tire.

9. A pneumatic tire according to claim 1 wherein the number of block elements in each of said circumferentially extending arrays is in the range of 36 to 56.

10. A pneumatic tire according to claim 2 wherein the number of block elements in each of said circumferentially extending arrays is in the range of 36 to 56.

11. A pneumatic tire according to claim 3 wherein the number of block elements in each of said circumferentially extending arrays is in the range of 36 to 56.

12. A pneumatic tire according to claim 4 wherein the number of block elements in each of said circumferentially extending arrays is in the range of 36 to 56.

13. A pneumatic tire according to claim 5 wherein the number of block elements in each of said circumferentially extending arrays is in the range of 36 to 56.

14. A pneumatic tire according to claim 2 wherein the number of block elements in each of said circumferentially extending arrays is in the range of 36 to 56.

15. A pneumatic tire according to claim 7 wherein the number of block elements in each of said circumferentially extending arrays is in the range of 36 to 56.

16. A pneumatic tire according to claim 8 wherein the number of block elements in each of said circumferentially extending arrays is in the range of 36 to 56.

17. A pneumatic tire according to any one of claims 2 to 9 and 10 to 16 wherein the ratio of the circumferential extent to the axial extent of each wide block element of said two axially centermost arrays is in the range of 0.9 to 2.1.

18. A pneumatic tire according to any one of claims 2 to 9 and 10 to 16 wherein the ratio of the circumferential extent to the axial extent of each wide block element of said two axially centermost arrays is in the range of 1.0 to 2.4.

19. A pneumatic tire according to any one of claims 2 to 9 and 10 to 16 wherein the ratio of the circumferential extent to the axial extent of each wide block of the two axially outermost arrays is in the range of 0.4 to 1.5.

20. A pneumatic tire according to any one of claims 2 to 9 and 10 to 16 wherein the ratio of the circumferential extent to the axial extent of the narrow block elements of the two axially outermost arrays is in the range of 0.7 to 1.9.

21. A pneumatic tire comprising a tread extending circumferentially abut the axis of rotation of the tire and having a pair of lateral edges with a sidewall portion extending radially inwardly from each lateral edge of the tread, said tire having an aspect ratio in the range of 0.60 to 0.95, a ratio of tread radius to maximum section width in the range of 1.2 to 2.2, and a ratio of tread radius to tread arc width in the range of 1.4 to 2.8; said tread having first and second straight grooves therein which extend circumferentially about the tire, one of said straight circumferentially extending grooves being disposed on each side of a mid-circumferential plane of the tire and each of said straight circumferentially extending grooves being spaced from said mid-circumferential plane by a distance in the range of 10% to 25% of the tread arc width, a circumferentially extending central groove is disposed such that it intersects the mid-circumferential plane of the tire, said central groove having a centerline that follows a zigzag path, thirty-seven to fifty-seven laterally extending zigzag grooves each of which extends across the tread are disposed circumferentially about the tire, said laterally extending zigzag grooves each having a centerline comprising end to end segments oriented at other than 0° with respect to one another and every other segment is oriented substantially perpendicular to the mid-circumferential plane of the tire, said circumferentially and laterally extending grooves cooperating with one another to define four circumferentially extending arrays of circumferentially aligned block elements, circumferentially aligned block elements of the two axially centermost arrays cooperating with one another to present a "V" formation, the portion of the tread that is disposed between the centerlines of said circumferentially extending straight grooves having a net-to-gross ratio that is at least 5% greater than the net-to-gross ratio of the portions of the tread that are disposed axially outwardly of the centerlines of the circumferentially extending straight grooves, said block elements having radially outer surfaces with the axial extends of the radially outer surfaces of circumferentially adjacent block elements in each circumferentially extending array alternating between wide and narrow widths.

22. A pneumatic tire according to claim 23 wherein for each said block element, the radially measured distance from a radially outermost surface of the block element to the radially innermost extent of any groove that is adjacent to the block element is in the range of 4% to 11% of the section height of the tire.

23. A pneumatic tire according to claim 22 wherein the ratio of the circumferential extent to the axial extent of each wide block element of said two axially centermost arrays is in the range of 0.9 to 2.1.

24. A pneumatic tire according to claim 22 wherein the ratio of the circumferential extent to the axial extent of the narrow block elements of said two axially centermost arrays is in the range of 1.0 to 2.4.

25. A pneumatic tire according to claim 22 wherein the ratio of the circumferential extent to the axial extent of the wide block elements of the two axially outermost arrays is in the range of 0.4 to 1.5.

26. A pneumatic tire according to claim 22 wherein the ratio of the circumferential extent to the axial extent of the narrow block elements of the two axially outermost arrays is in the range of 0.7 to 1.9.

27. A pneumatic tire according to any one of claims 22 to 26 wherein for the two axially centermost arrays the axial extent of the radially outer surfaces of the wide block elements is in the range of 14% to 20% of the tread arc width and the axial extent of the narrow block elements is less than that of the circumferentially adjacent wide block elements and is in the range of 10% to 16% of the tread arc width.

28. A pneumatic tire according to any one of claims 22 to 26 wherein for the two axially outermost arrays the axial extent of the radially outer surfaces of the wide block elements is equal to the distance from a tread edge to the nearest straight circumferential groove and the axial extent of the radially outer surfaces of the narrow block elements extends from said straight circumferential groove for 60% to 90% of the axial extent of said wide block elements of the same array.

29. A pneumatic tire according to claim 27 wherein for the two axially outermost arrays the axial extent of the radially outer surfaces of the wide block elements is equal to the distance from a tread edge to the nearest straight circumferential groove and the axial extent of the radially outer surfaces of the narrow block elements extends from said straight circumferential groove for 60% to 90% of the axial extent of said wide block elements of the same array.

30. A pneumatic tire comprising at least one carcass ply of side-by-side nonmetallic cables which intersect a mid-circumferential plane of the tire at 75° to 90° with respect to said plane, at least one belt ply of side-by-side metallic cables being disposed radially outwardly of the carcass ply in a crown portion of the tire, a tread being disposed radially outwardly of the belt ply and extending circumferentially about the axis of rotation of the tire and having a pair of lateral edges with a sidewall portion extending radially inwardly from each lateral edge of the tread, said tire having an aspect ratio in the range of 0.60 to 0.95, a ratio of tread radius to maximum section width in the range of 1.2 to 2.2, and a ratio of tread radius to tread arc width in the range of 1.4 to 2.8; said tread comprising first and second straight grooves therein which extend circumferentially about the tire, one of said straight circumferentially extending grooves being disposed on each side of the mid-circumferential plane of the tire and each of said straight circumferentially extending grooves being spaced from said mid-circumferential plane by a distance in the range of 10% to 25% of the tread arc width, a circumferentially extending central groove is disposed such that it intersects the mid-circumferential plane of the tire, said central groove having a centerline which follows a zigzag path comprising end to end segments oriented at other than 0° with respect to one another with every other segment oriented substantially parallel to the mid-circumferential plane of the tire, thirty-seven to fifty-seven laterally extending zigzag grooves each of which extends across the tread are disposed circumferentially about the tire, said laterally extending zigzag grooves each having a centerline comprising end to end segments oriented at other than 0° with respect to one another and every other segment is oriented substantially perpendicular to the mid-circumferential plane of the tire, said circumferentially and laterally extending grooves cooperating with one another to define four circumferentially extending array of circumferentially aligned block elements, circumferentially aligned block elements of the two axially centermost arrays cooperate with one another to present a "V" formations, said block elements having radially outer surfaces, the axial extend of the radially outer surfaces of circumferentially next adjacent block elements in each circumferentially extending array alternating between wide and narrow widths, and the portions of the tread that is disposed between the centerlines of said circumferentially extending straight grooves having net-to-gross ratio that is in the range of 0.4 to 0.5 and is at least 5% grater than the net-to-gross ratio of the portions of the tread that are disposed axially outwardly of circumferentially extending straight grooves.

31. A pneumatic tire according to claim 30 wherein the ratio of the circumferential extent to the axial extent of each wide block element of said two axially centermost arrays is in the range of 0.9 to 2.1.

32. A pneumatic tire according to claim 30 wherein the ratio of the circumferential extent to the axial extent of each narrow block elements of said two axially centermost arrays is in the range of 1.0 to 2.4.

33. A pneumatic tire according to claim 31 wherein the ratio of the circumferential extent to the axial extent of the wide block elements of the two axially outermost arrays is in the range of 0.4 to 1.5.

34. A pneumatic tire according to claim 31 wherein the ratio of the circumferential extent to the axial extent of the narrow block elements of the two axially outermost arrays is in the range of 0.7 to 1.9.

* * * * *